United States Patent

[11] 3,580,084

| [72] | Inventor | Harold A. Kramer |
| | | West Hyattsville, Md. |
| [21] | Appl. No. | 522,784 |
| [22] | Filed | Jan. 24, 1966 |
| [45] | Patented | May 25, 1971 |
| [73] | Assignee | The United States of America as represented by the Secretary of Agriculture |

[54] PNEUMATIC PROBE SAMPLER
3 Claims, 6 Drawing Figs.

[52] U.S. Cl. ............................................. 73/421
[51] Int. Cl. ............................................. G01n 1/14
[50] Field of Search ................................. 73/421 (B); 285/308, 314, 319, 317 (Inquired)

[56] References Cited
UNITED STATES PATENTS

| 2,771,776 | 11/1956 | Haven | 73/421 |
| 2,784,011 | 3/1957 | Roberts | 385/308 |
| 3,233,463 | 2/1966 | Kaufman | 73/421 |
| 3,262,318 | 6/1966 | Decker | 73/421 |

*Primary Examiner*—S. Clement Swisher
*Attorneys*—R. Hoffman and W. Bier

ABSTRACT: A pneumatic probe for taking samples of grain and other particulate material from the bottom of a bin comprises two concentric tubes spaced sufficiently apart to permit passage of the material when entrained in a stream of air. The outer longer tube has a serrated edge to enable it to penetrate dense sections, while the inner, shorter tube is provided with helical vanes. Air, blown down the outer tube is caused to swirl in a vortex by the helical vanes, thereby entraining material lodged near the bottom of the outer tube. The air, together with entrained material, passes up the inner tube and is conducted to a cyclone separator to recover the sample.

PATENTED MAY 25 1971 3,580,084

INVENTOR
HAROLD A. KRAMER

BY R. Hoffman

ATTORNEY

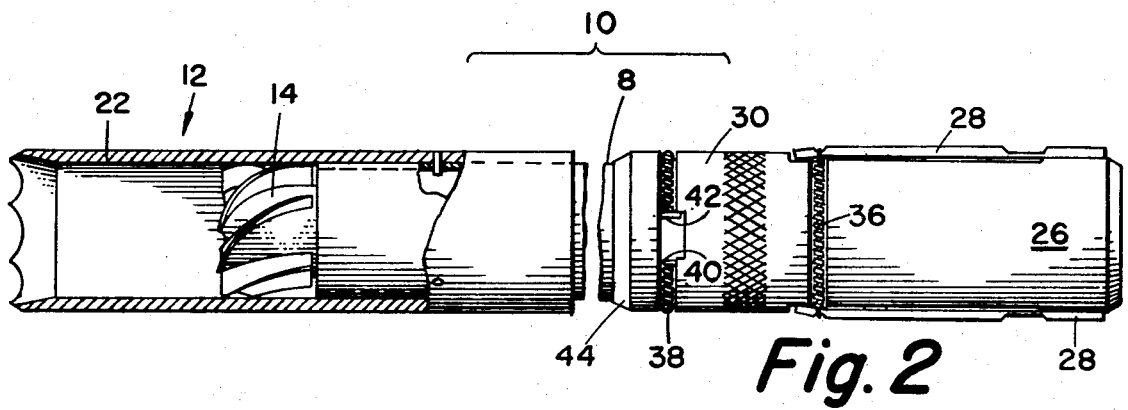
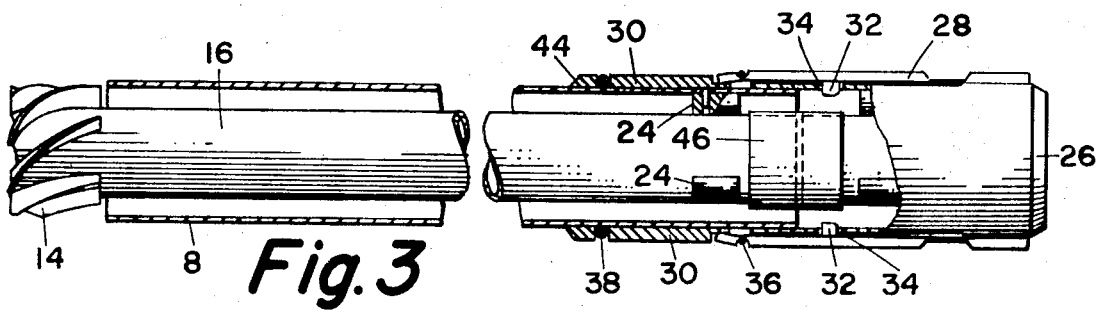
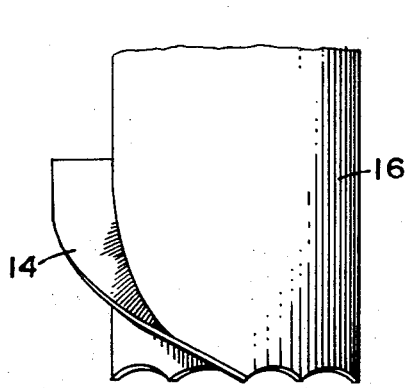
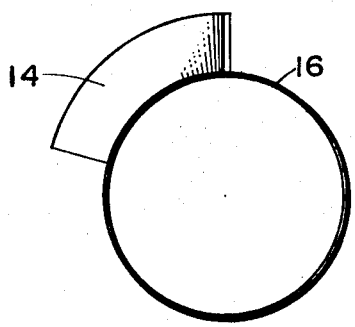
INVENTOR
HAROLD A. KRAMER
BY R. Hoffman
ATTORNEY

PNEUMATIC PROBE SAMPLER

A nonexclusive, irrevocable, royalty-free license in the invention herein described, throughout the world for all purposes of the United States Government, with the power to grant sublicenses for such purposes, is hereby granted to the Government of the United States of America.

This invention relates to a device for collecting samples of granular material. More particularly the invention relates to a pneumatic sampling device having a double wall tubular probe with a vortex tip.

Obtaining representative samples of stored grain has been a matter of concern to the industry for a long time. With huge quantities of grain accumulating in government storage facilities as well as that in private storage, the need for a more rapid and efficient sampling device has become more pronounced. It is important to detect insects and mold in stored grain so that steps can be taken to move or fumigate the grain before it is seriously damaged. In using storage facilities to its best advantage, leaving only a few feet of head space, there is not enough room for sampling with a conventional probe. Furthermore, the introduction of large, covered hopper cars for transporting grain has made it difficult, if not impossible, to obtain a representative sample of tightly packed grain in the bottom of these large rail cars. Accordingly, there is need for an improved sampling device.

An object of the present invention is to provide a sampling device that is easy to operate. Another object is that of providing a means for more efficient collection of a representative sample of granular material. A further object is to provide a sampler which makes it possible to obtain representative samples of granular material from any type of storage container.

Other objects and a fuller understanding of the invention will be apparent from the following description and claims, taken in combination with the drawings in which;

FIG. 2 is a view of a pneumatic probe section, partially cut away to show details of a vortex tip and, at the other end, connecting means for attaching the probe section to an air source or to other sections (extensions);

FIG. 3 is another view of the probe, most in cross section to illustrate details of a connector;

FIG. 5 illustrates curvature of a vane along the circumference of the inner tube; and FIG. 6 is an end view to illustrate positioning of a vane on the tip end of the inner tube.

The pneumatic probe of the present invention comprises a double wall tubular body section, a vortex tip at one end of the body section to provide a sampling end and a mechanical connector at the other end of the body section to provide a substantially airtight connection to an air supply and sample collector.

Air from the supply source proceeds generally linearly forward in the space between the inner and outer tubes, an a plurality of vanes in this space terminating in the plane of the end of the inner tube, deflect the direction of the air so that air rotation occurs within an extension of the outer tube, at the tip. The rapidly rotating air (vortex) within the tip simulates the natural and highly effective air movement produced in nature by tornadoes. The rotating air is withdrawn from the tip through the inner tube of the probe by vacuum and thus granular material at the tip is conveyed by the air to a collector.

More particularly, the sampler of the present invention comprises a first cylindrical tube of sufficient size to permit passage of granular material entrained in a stream of air; a second cylindrical tube, larger and longer than the first tube, the first tube being inserted into the second tube until one end of each tube terminates in a common plane, providing a connector end, a portion at the other end of the larger (second) tube thus extending beyond the smaller (first) tube to provide a tip end; a plurality of vanes intermediate the tubes originating at the tip end of the smaller tube and a plurality of spacers intermediate the tubes proximate the connector end and serving to concentrically align the tubes, the vanes being adapted by curvature at the tip end to change a linear airflow in the passageway between the tubes to a rotational airflow within the portion of the larger tube extending beyond the smaller tube, the extended portion (tip) being of sufficient length, preferably about the minimum length sufficient, to establish a vortex by the rotating air as it comes off the vanes and returns via the smaller tube; means for providing a substantially airtight connection to each of the tubes, means for providing linear airflow in the passageway between the tubes, and means for collecting granular material entrained in the returning air.

While the sampling device of the present invention has been used most often for sampling grain such as wheat and corn it can be used for other grains such as barley, rye, sorghum and oats; for pea beans and peanuts; for seeds such as cottonseed, millet and rape; and for other granular material such as salt, sugar and fertilizers.

Figure 1:
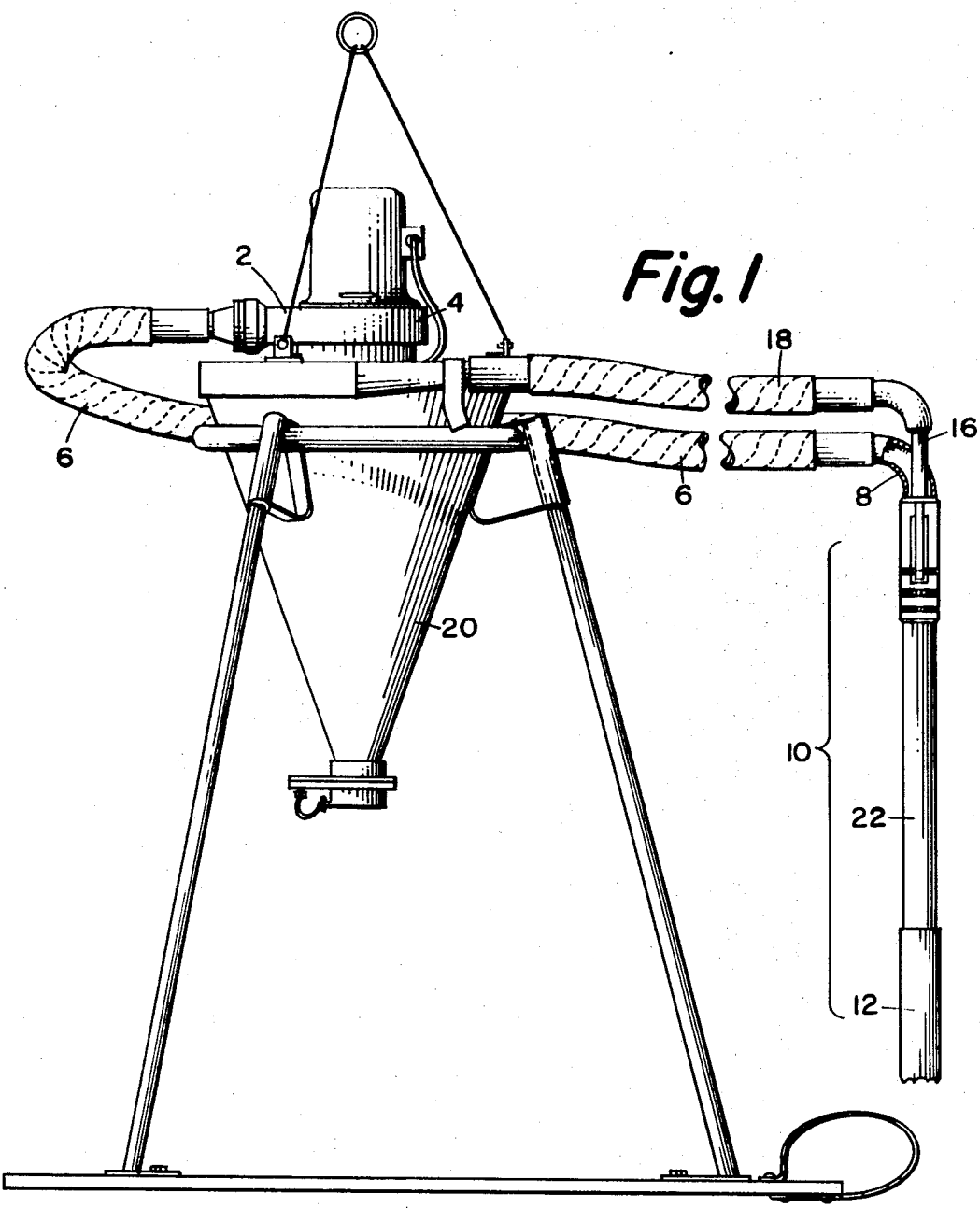
FIG. 1 shows a general assembly arrangement of an embodiment of the invention, partially cut away to show tube arrangement in a hose unit.

In the embodiment shown in FIG. 1 the apparatus is illustrated as assembled for use as a closed system. Air from the discharge 2 of an exhaust fan 4 is conveyed by hose 6 and outer tube 8 of tubular probe 10 to the vortex tip 12. At the tip end the air is caused to rotate by vanes 14 (FIG. 2). Suction (vacuum) produced by the exhaust fan withdraws the rotating air from the tip through the inner tube 16 and hose 18. Granular material from the commodity being sampled, which becomes entrained in the rotating air, is conveyed by the air to a cyclone collector 20. The air returns to the inlet (suction side) of the exhaust fan for another cycle.

As far as the rotation of the air and the conveyance of the granular material into the inner tube is concerned, the probe tip could consist of the outer tube 8. A more durable sampler is obtained, however, by use of thicker, stronger tubing for the probe tip 22. As shown in FIG. 2, this substitute for the tip portion of the outer tube is integral with or securely attached as a sleeve to the outer tube, and the latter is terminated prior to the vanes 14, so there is no possibility of causing turbulence in the vortex area. The sampling end of the probe tip is adapted for cutting through a moldy layer of grain, tapering to a thin scalloped edge which provides easy access of the granular material into the tip.

Tests with air measuring instruments and actual sampling of grain show that there is an optimum distance at which the turning vanes should be located from the edge of the sampling end. As will be apparent to those skilled in the art, various factors such as curvature of vanes and diameter of the tip will determine the distance from the vanes at which the vortex has optimum effectiveness in entraining granular material. In the embodiment illustrated, the vanes terminated in a plane of 25° from perpendicular to the long axis of the probe (also from plane of end of inner tube) and the ratio of distance of the vanes from the sampling end to the diameter of the tip was slightly greater than 2:1. Since this ratio can vary with engineering design, the critical feature is that the tip extend a sufficient distance from the vanes to establish an effective air vortex within the tip.

If the length of the tip places the sampling end substantially beyond the principal vortex in the tip, the air action of the probe will be less effective in removing granular material at the sampling end and more effort will be required of the operator to insert the probe, especially into deep storage containers. Accordingly, the preferred length of the tip (extended portion) is about the minimum length needed to establish the air vortex.

The tubes 8 and 16 are fixedly aligned concentrically by the plurality of vanes 14 at one end and plurality of spacers 24 (FIG. 3) proximate the other (connector) end.

Figure 4:
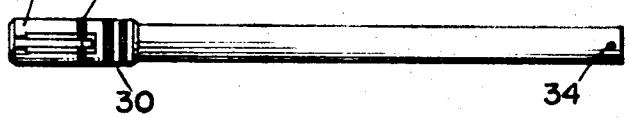
FIG. 4 shows one of the extension sections which are used to increase the length of the probe.

The probe section is connected to the hose unit or to an extension section (FIG. 4) by means of a positive locking, rapidly released connector (cf. FIG. 3). The connector comprises a female coupling 26, rigidly secured to the outer tube 8 of the probe section; two stop bars 28, aligned with the long axis of the coupling, diametrically opposed on the periphery of the coupling and secured adjacent the terminal end thereof, the other end of each stop bar projecting beyond the coupling sleeve so as to engage a swivel 30. Each stop bar is provided with a centrally projecting stop pin 32. The male end of the unit to be connected is provided with appropriately located holes 34 (cf. FIG. 4). After insertion of the male end into the female coupling a slight rotation of either aligns the stop pins with the holes, the stop pins enter the holes due to tendency of the stop bar to return to rest position (minimum proximity to the coupling) and by the urging of spring 36. The projecting ends of the stop bars in rest position reside on flat indentations on swivel 30. Turning the swivel so that an arcuate surface engages the stop bar forces the latter away from rest position and disengages the stop pins from the holes, allowing the male end to be removed from the coupling. The swivel is automatically returned to original position by means of springs 38 connected by pins 40 and 42 to retaining ring 44 which is secured to tube 8. The springs prevent accidental disengagement of lock pins when the tubes are connected.

Additional stop bars and related adaptations can be supplied if desired, but two pins are adequate to provide a firm connection of the probe section to the hose unit or extension sections.

Tube 16, the inner tube, is provided with a coupling 46 within which the smaller tubes meet to establish an abutting joint. No seal is required.

Extension sections (FIG. 4), typically 2 feet in length, provide a means for locating the probe tip at a considerable distance from the operator. The removal of the granular material at the tip end by the air stream eliminates a major part of the normal resistance to insertion of a probe so that sampling is conducted rapidly and easily.

The sampler is now described with reference to a working model. A piece of 0.035-inch stock, 0.937-inch O.D. (outside diameter) steel tubing, 2 feet in length was used for the inner tube of the probe assembly. Eight vanes were prepared from 0.025-inch stock, the strips 1⅜ inch × ¼ inch being curved, as the arc of a circle having a ¾ inch radius, along about 1.18 inches from one end. The strips were equally spaced and silver soldered adjacent one end of the tube with the curved ends terminating in the plane of the end of the tube as shown in FIGS. 3 and 6. The end of the inner tube was scalloped intermediate the points of attachment of the vanes, each scallop representing an arc of the circumference of a circle 0.38 inch in diameter, as shown in FIG. 5. The scalloping is optional, but is considered a favorable feature.

About 2 inches from the other end of the tube, three spacers 24 were spot welded to the outside of the inner tube, each spacer being located substantially 120° (based on long axis of tube) from the next. A coupling 46, 1 inch in length, was sweat soldered to the inner tube adjacent the spacers with half the length of the coupling projecting beyond the tube so as to receive another inner tube of similar diameter. A tube of 0.035-inch stock, 1.437-inch O.D. and 22.94 inches in length was pushed over the spacers, aligned as shown in FIG. 3; one end being adjacent the vanes, the other terminating in the same plane as the inner tube; and secured to the spacers with spring pins. Other means of securing may be used, but the use of spring pins here, and for other attachments, is for convenience of repair.

The probe tip was made from 0.120-inch stock, 1.687-inch O.D. seamless steel tubing. Eight equally spaced scallops (arc of a circle 0.69 inch diameter) were ground into one end, and the tubing in the area of the scallops was tapered from both the inside and outside to provide a thin cutting edge, as shown in FIG. 1. The other end of the probe tip was carefully slipped over the vanes, snugly overlapping a portion of the outer tube as a coupling, until the plane of the scalloped cutting edge was 3.12 inches from the plane of the end of the inner tube. The tip was securely, but removably, attached to the outer tube with spring pins.

The cylindrical components of the connector, the coupling, swivel and retaining ring, were also made from 1.447-inch I.D.–1.687inch O.D. seamless steel tubing. The coupling was milled to provide flat surfaces centered 180° apart for positioning the stop bars.

Opposing holes, 0.312-inch diameter, were drilled to receive the stop pins made from 0.25-inch drill rod. The stop bars were positioned, the stop pins soldered to the stop bars and the stop bar secured to the coupling at the end opposite the swivel. For reasons previously described the swivel was milled on 180° centers to have flat areas to receive offset overlapping ends of the stop bars. Opposing end surfaces of the swivel and retaining ring were drilled in appropriate locations to receive small pins to which springs could be attached for automatically returning the swivel to the locked position. The retaining ring, swivel and coupling were slipped on the outer tube, the coupling was secured, as by soldering, in the position shown in FIG. 3, the swivel was placed adjacent the coupling, the springs and retaining ring were adjusted and the retaining ring secured to the outer tube with spring pins.

In assembling the components of the probe section the particular securing means, such as soldering or spring pins, is a matter of engineering design and optional means, such as threaded joints, set screws, or rivets can be used as long as means of attaching parts does not interfere with proper functioning of the assembled apparatus.

The use of the pneumatic sampler of the present invention is not limited to the closed system assembly of FIG. 1. As an open system, hose 18 is connected by an appropriate fitting to the inner tube 16 of the probe assembly or of an extension section. Operation of the fan causes a vacuum in the inner tube, atmospheric pressure forces air through the outer tube and past the vanes, linear motion of the air is changed to rotational motion, and granular material at the tip is entrained in the whirling air, sucked into the inner tube, and conveyed to the collector. Air from the fan is discharged to the atmosphere.

Another alternative system is that of a pressure system. Air from a blower, under positive pressure, is forced through the outer tube to the vortex tip. There is no vacuum, but the air moves along the path of least resistance which is through the inner tube, to a collector at atmospheric pressure. In this system the vanes continue to provide rotational motion to the air in the tip, and granular material is entrained and carried by the air to a collector.

From the foregoing description, taken together with the accompanying drawings, it will be readily apparent to those skilled in the art that this invention provides an improved method and apparatus for obtaining samples of granular material from bulk containers.

While a preferred embodiment of the invention has been shown, which is capable of fulfilling the objects and advantages sought, it is to be considered that other modifications and variations may be made by those skilled in the art without departing from the scope of the invention, as defined in the appended claims.

I claim:

1. A pneumatic probe sampler having a first cylindrical tube of sufficient size to permit passage of granular material entrained in a stream of air, a second cylindrical tube larger and longer than said first tube, said first tube being inserted into said second tube until one end of each tube terminates in a common plane to provide a connector end, a portion at the other end of said second tube thus extending beyond said first tube at a tip end, a plurality of vanes intermediate said first and second tubes, said vanes originating at the tip end of said first tube and extending in the direction of said connector end, a plurality of spacers proximate said connector end and intermediate said first and said second tubes, said vanes and said spacers adapted to concentrically align said tubes and provide passageway for linear airflow between said tubes, said vanes being adapted by curvature at said tip end to change said linear airflow to rotational airflow within said portion of said second tube extending beyond said first tube, said portion of said second tube being sufficient in length to establish a vortex by said rotational airflow within said portion, means for providing said linear airflow in said passageway between said tubes and means for collecting said granular material entrained in said stream of air, and a substantially airtight connector for each of said first and second tubes which comprises:
a. a tubular coupling adapted to overlap the connector end of said first tube and the end of a tube having a diameter similar to said first tube; and
b. a positive-locking, readily releasable connector for said second tube comprising a female coupling having a secured end and a terminal end rigidly secured to said second tube, a plurality of stop bars adapted to have a secured end and a free end aligned with the long axis of said coupling and secured adjacent said terminal end of said coupling so that the free end of said stop bar projects beyond the plane of the secured end of said coupling, a swivel adapted to rotate through a limited arc on said second tube adjacent said coupling and adapted in a first position to receive said free end of the stop bar in a rest position whereby said stop bar is in minimum proximity along its length to said coupling and in a second position to force said free end away from said rest position, a retaining ring secured to said second tube adjacent said swivel, at least one pin projecting from said ring intermediate said ring and said swivel and at least one pin projecting from said swivel intermediate said swivel and said ring, a spring adapted to engage in said pins and apply force to retain said swivel in said first position, a centrally projecting stop pin secured to each stop bar intermediate said secured end and the plane of the end of said second tube, a hole in said coupling adapted to receive said stop pin, a male end of a second tube, holes in said male end adapted to receive said stop pin when said stop bar is in rest position, the length of said stop pin being adapted to disengage from said hole in said male end when said stop bar is forced away from said rest position, and a spring adapted to urge said stop bars towards said rest position.

2. The probe sampler of claim 1 in which the extended portion of the second tube comprises a thicker walled tube than said second tube adapted to be securely attached to said second tube to provide continuity therewith.

3. The probe sampler of claim 2 in which the extended portion is adapted by tapering and scalloping to provide an end which will readily penetrate into a supply of granular material.